O. G. BECK.
CHOKE REMOVING APPLIANCE.
APPLICATION FILED FEB. 25, 1918.

1,293,306.

Patented Feb. 4, 1919.
4 SHEETS—SHEET 1.

Inventor
O. G. Beck
By Jerry A. Mathews,
Attorney

O. G. BECK.
CHOKE REMOVING APPLIANCE.
APPLICATION FILED FEB. 25, 1918.

1,293,306.

Patented Feb. 4, 1919.
4 SHEETS—SHEET 3.

Inventor
O. G. Beck
By Jerry A. Mathews,
Attorney

O. G. BECK.
CHOKE REMOVING APPLIANCE.
APPLICATION FILED FEB. 25, 1918.
1,293,306.
Patented Feb. 4, 1919.
4 SHEETS—SHEET 4.
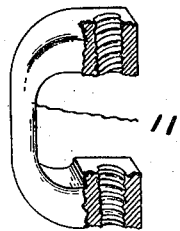
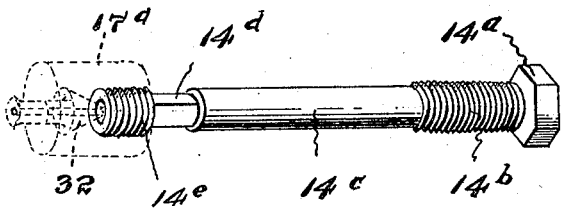
Fig. 8.
Fig. 9.
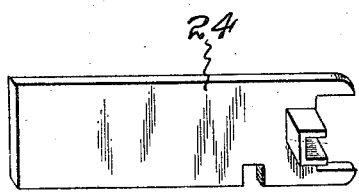
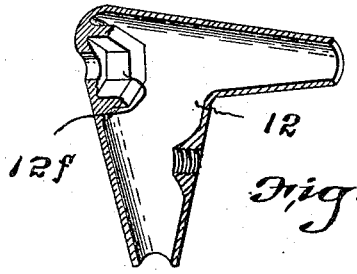
Fig. 11.
Fig. 10.
Inventor
O. G. Beck,
By Jerry A. Mathews
Attorney

UNITED STATES PATENT OFFICE.

OSCAR G. BECK, OF HERRICK, ILLINOIS.

CHOKE-REMOVING APPLIANCE.

1,293,306.

Specification of Letters Patent. Patented Feb. 4, 1919.

Application filed February 25, 1918. Serial No. 219,116.

*To all whom it may concern:*

Be it known that I, OSCAR G. BECK, a citizen of the United States, residing at Herrick, in the county of Shelby and State of Illinois, have invented a new and useful Choke-Removing Appliance, of which the following is a specification.

The object of my invention is to make it possible for one to remove the obstructing material from the esophagus in case of choking. The principal object of my appliance is to remove an oats choke in the horse, although it will often be found effective where other substances are the obstructing material, and in other animals. It is also my object to provide a device that can be easily attached to an ordinary stomach tube, and which is so constructed that it is easily repaired when required, and at slight expense.

I attain the objects of my invention by the mechanism illustrated in the accompanying drawings, in which—

Fig. 8 is a perspective of double clamping bur 11, enlarged, and partly in section;

Fig. 9 is a perspective of tube 14, enlarged;

Fig. 10 is a detail sectional view of elbow connection 12, enlarged; and

Fig. 11 is a perspective of wrench 24, showing the relation of the knuckle to the handle of the wrench.

Like numerals designate like parts in each of the views.

Figure 1:
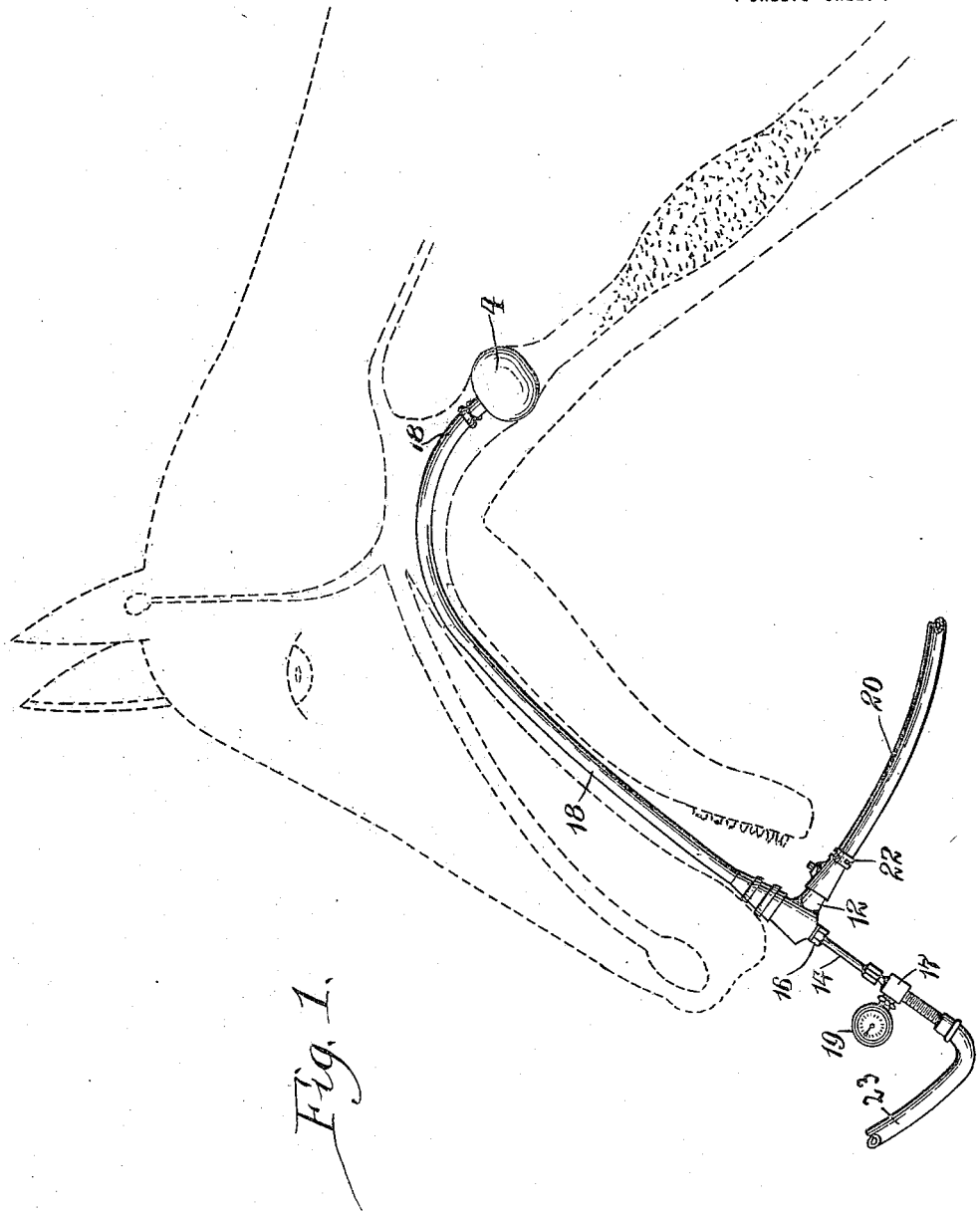
Figure 1 is a perspective of the appliance in use.
Figure 2:
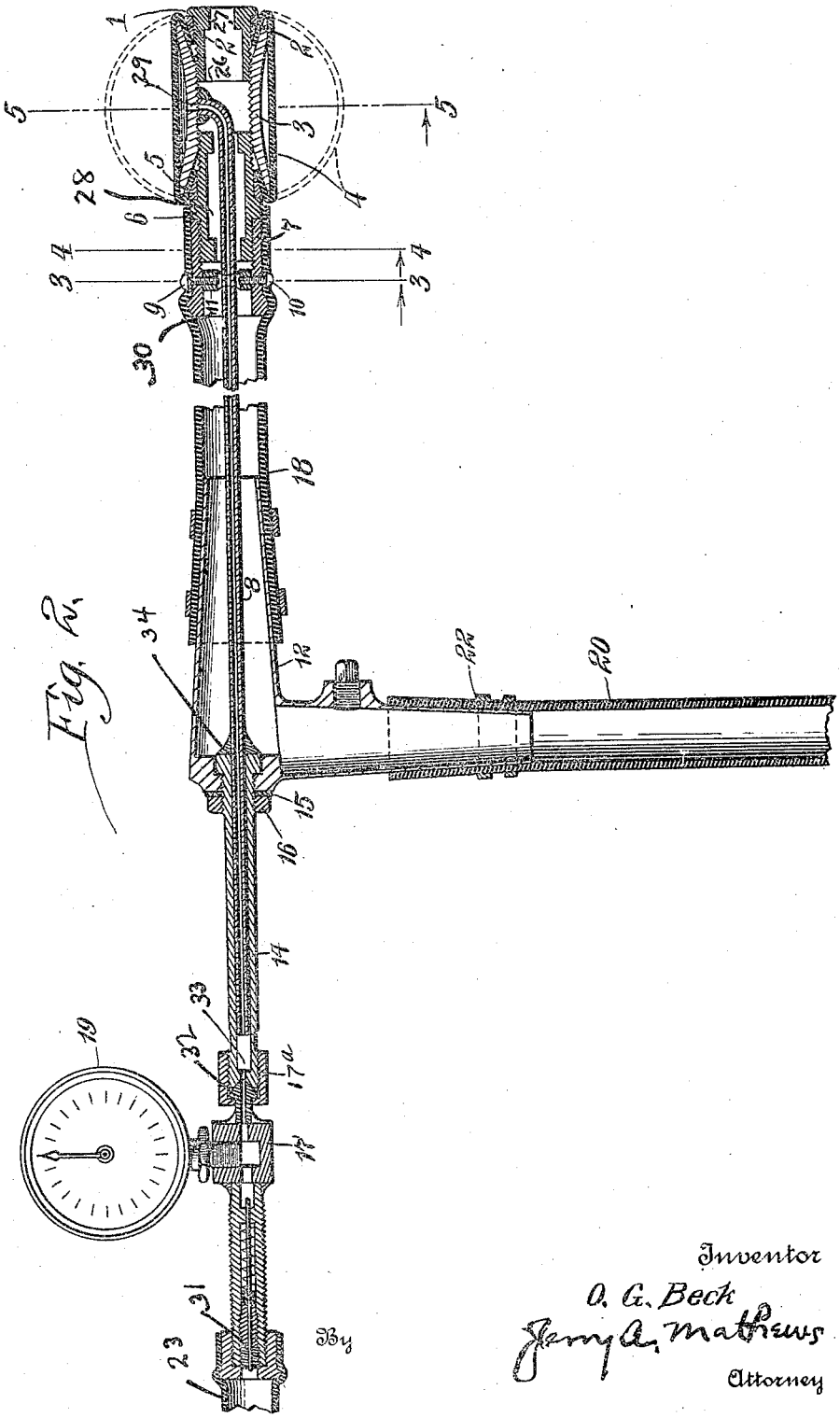
Fig. 2 is a longitudinal section of the invention.
Figure 5:
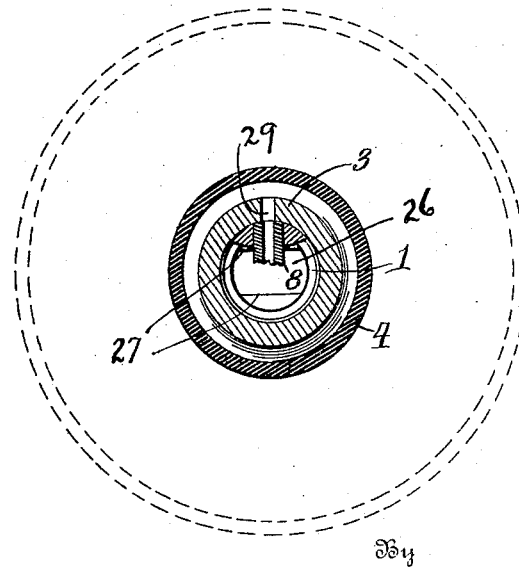
Fig. 5 is a transverse section on line 5—5 of Fig. 2.

Referring to Figs. 2 and 5 I provide a front end tap 1 which resembles a short hollow bolt, and which is provided with a passage 26 through the center for the flow of water. The front end of passage 26 is provided with at least two flat surfaces or sides 27 which make a socket for a wrench. Member 1 is provided with male threads on the posterior end by means of which it is secured removably to bulb spool 3. Bulb spool 3 is provided with a concave outer surface, so as to afford a suitable air space between it and the inflatable rubber tube or bulb 4, which operates as a dam in the esophagus when inflated, as illustrated in Fig. 1. Member 4 is held in place by an anterior pressure cone 2 and a posterior pressure cone 5, each of which members secure member 4 snugly in place over spool 3 and make an airtight connection. I further provide a double connecting tap 6, to which spool 3 is removably secured in threaded engagement. Member 6 resembles a short bolt with a round head near the center and threaded on both ends. It has a passage lengthwise through the center, designated by numeral 28, for the flow of water, and also for the accommodation of a small tube or hollow wire 8 which connects with opening 29 in spool 3 to provide a passage for the flow of air into the space between spool 3 and the rubber tube or bulb 4 for the inflation of that member. The openings in either end of member 6 have opposite flat surfaces to hold a wrench for tightening and loosening this member, the jaws or reinforced portions at either end being made use of in tightening or loosening member 6 from member 3 or member 7, as required. Members 6 and 7 are preferably of metal so that they will not break if the horse catches them between his teeth.

Figure 3:
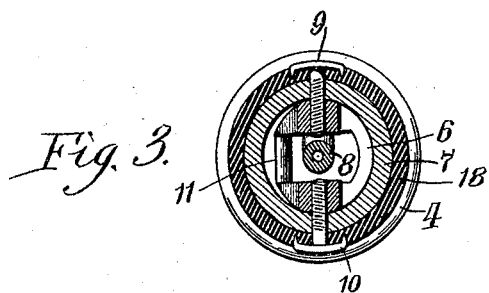
Fig. 3 is a transverse section on line 3—3 of Fig. 2.

I further provide a stomach tube tap 7 of cylindrical form with a round head on one end, this member being screw threaded on member 6. Member 7 is provided with a longitudinal passage 30 for the flow of water and to contain the hollow wire 8. Member 7 is flexibly connected with elbow connection 12 by means of a suitable flexible stomach tube 18. Tube 18 is of any desired size and length, and is securely fastened to tube tap 7 by the clamping screws 9 and 10, which, it will be observed, by reference to Figs. 2 and 3 are reversely threaded, member 9 being a right-handed clamping screw and member 10 a left-handed clamping screw. These members aid in forming a watertight connection between tube 18 and tube tap 7. The screw heads have a long and short diameter and the surface of the head which comes in contact with the stomach tube is flat, with the edges beveled. The top surfaces of the heads of these screws are rounded to prevent injuring the esophagus. I provide a double clamping bur, which is engaged by screws 9 and 10. Bur 11 has an extension or bar on one side of each half of that member, which connects these two portions of the bur. This bar portion has a narrow neck in the center where the wrench or lever 25 is applied when turning the tap. As shown in Fig. 3, bur 11 is provided with oppositely threaded portions to engage with the opposite clamping screws 9 and 10, and with a cylindrical connecting portion which curves outward a little in the center to give more leverage when the bur is to be turned. The bur is operated by engaging the hook portion of wrench 25 in the central portion of the bur to pull same and turn the bur to a point where it may be further rotated by pushing against it with either end of the wrench 25. Bur 11 makes a water-tight connection between the stomach tube and the stomach tube tap. The object of this tap is to tighten and loosen clamping screws 9 and 10. Elbow connection 12 is attached to a water pump connection 20 by means of hose clamp 22. Connection 20 is a piece of rubber tubing, of any desired length. The end not illustrated slips over the overflow spout of a suitable water pump, such pump being any suitable veterinary stomach pump of ordinary construction.

Connected with elbow 12 in threaded engagement, preferably, I provide a lengthening and strengthening tube 14, into which hollow wire 8 extends. Tube 14 is secured to elbow 12 by suitable elbow nut 16 and elbow washer 15, forming a watertight connection. A passage for the flow of air extends the entire length of tube 14, which is operatively connected with air gage connection 17, which is provided with a suitable air pressure gage 19. Gage 19 is a sensitive or light-pressure gage. It should at least register in half pounds up to 30 pounds. The object of the air pressure gage is to tell how much pressure is being used in bulb 4; if bulb 4 should puncture or a leak appear at some of the connections or in the hollow wire 8 the hand of the pressure gage would register zero. If water escapes through the patient's mouth it is because bulb 4 is not sufficiently inflated. I provide a suitable valve 31 for regulating a flow of air to the pressure gage. Member 17 is provided with a nipple 32, which is secured in communication with the passage 33 through tube 14. It will be observed that tube 14 has hollow wire 8 soldered to it at 34. One of the purposes of tube 14 is to assist in pulling hollow wire 8 through the stomach tube when the appliance is being installed in a tube. Tube 14 is provided with an enlarged flat-sided (preferably six-sided) head 14$^a$ adapted to seat in a corresponding opening 12$^f$ in member 12 and to prevent the tube from turning when tightening or loosening tap 16; with a threaded portion 14$^b$ engaged by member 16; with a body 14$^c$, having flattened surfaces 14$^d$ forming the neck which terminates in the threaded portion 14$^e$ which connects with the tap of the air gage connection, as shown in Figs. 2 and 9. Tap 17$^a$ is screwed on to the threaded end of 14; the wrench is then applied at the flattened surfaces 14$^d$ next to the threaded end of member 14; and then by pulling on the wrench the tube and wire are pulled to their proper places. Tap or elbow nut 16 is provided to make a water tight connection between members 14 and 12. When member 14 is at its proper place in the elbow connection the tube will be prevented from turning by its head fitting into the six-sided opening 12$^f$ as shown in Fig. 10 in member 12. A water tight connection is formed between members 14 and 12. Member 14 further prevents any kinking of hollow wire 8, which might stop the flow of air.

Connected with member 31 is a suitable flexible tube 23 leading to any suitable pump, such as an ordinary automobile tire pump, which may be employed to inflate bulb 4.

Figure 6:
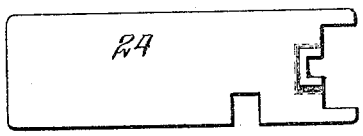
Fig. 6 is a detail of member 24.
Figure 4:
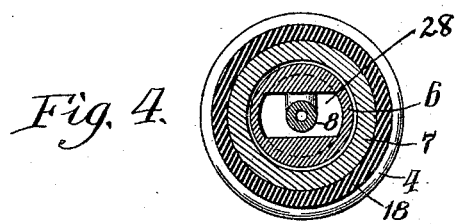
Fig. 4 is a transverse section on line 4—4 of Fig. 2.
Figure 7:
Fig. 7 is a detail of member 25.

Referring to Fig. 6, I provide a knuckle wrench 24 as illustrated, for turning the six-sided taps used in this appliance. It will be observed that the knuckle of the wrench 24 has a notch which alines with the small notch in the end of the wrench. This notch is just wide enough to receive the hollow wire 8 and deep enough to receive the hollow wire and the small end of the bar wrench 25 simultaneously. The end of the wrench 25 fits snugly into the notch in the knuckle so as to support the jaws of the knuckle and help to keep them from bending or breaking when the wrenches 24 and 25 are used in conjunction with each other to turn the taps 1 and 6. The small notch on the side of wrench 24 fits over the flattened surfaces 14$^d$ of tube 14, when used to assist in pulling tube 14 through the opening in the elbow connection when the appliance is being installed in a stomach tube, and also to prevent the tube 16 from turning when the tap of the pressure gage is being tightened or loosened. The end notch in wrench 24 will fit over any of the six sided taps used in connection with my appliance, and the wrench then turns like any ordinary wrench. When the end tap 1 is to be turned the knuckle of wrench 24 is placed in the flat-sided opening in the end of tap 1; then the small end of wrench 25 is placed in the notch in the knuckle of wrench 24 and then the wrench 24 is to be turned like any ordinary wrench. When member 6 is to be turned the knuckle of wrench 24 is placed in the flat sided opening in the free end of member 6. When this is done the hollow wire 8 will fit into the groove in the knuckle of wrench 24. The small end of the hook wrench 25 is then inserted in the notch in the knuckle of wrench 24 (the notch in the knuckle of wrench 24 then containing the hollow wire 8 and the end of the bar wrench 25). Wrench 24 is then turned as an ordinary wrench. The side notch of wrench 24 fits over the flat surfaces of member 14 and is used for pulling member 14 to its proper place in the elbow connection 12 and also to prevent member 14 from turning when the tap of the pressure gage connection is being tightened or loosened. The hook wrench 25 is used to turn the clamping bur 11; and it also serves as a brace for the jaws of the knuckle of wrench 24 to prevent them from breaking or bending when used in connection with that wrench. I further employ a suitable bar or hook wrench 25 as illustrated in Fig. 7 for turning member 11 and members 1 and 6 in conjunction with 24. The hook portion of the wrench 25 is applied to the cylindrical central connecting portion of member 11 to turn same. Wrench 25 is also used as a brace to prevent the jaws of the knuckle on the side of wrench 24 from breaking or bending when the end tap 1 or the double connecting tap 6 are being turned.

In operating the appliance bulb 4 is inflated by air supplied from a suitable air pump (not illustrated) which forces the air through tube 23, valve 31, air gage connection 17, tube 14 and hollow wire 8 to passage 29 which opens into the chamber formed between member 4 when deflated and the concave outer surface of spool 3. The amount of air pressure employed is shown by air gage 19. When bulb 4 is inflated it makes a dam in the esophagus to prevent the escape of water from the esophagus into the windpipe or nasal or oral passages. In consequence of the damming of the esophagus the operator is enabled to force water, which is fed through tube 20, elbow 12, stomach tube 18 and passages 30, 28, and 26, into the esophagus of the animal and against and into the obstructing material which is the cause of the choke, thereby softening the mass and gradually washing it down a little at a time or forcing the whole down by direct pressure of the water.

Member 14, it will be observed, has both its threaded ends of the same size, and the diameter of the tube between these threads being smaller than the diameter of the threaded portions, will allow member 16 to pass loosely from one set of threads to the other.

Referring to Fig. 6, knuckle wrenches 24 are utilized for turning members 1 and 6 and the six sided taps used in this appliance, and also for adjusting the strengthening tube 14 which is received in and engaged by the side notch in the wrench.

What I claim is:

1. In a choke removing appliance, the combination of an inflatable rubber tube adapted to form a dam in the esophagus of an animal, a conduit for supplying air under pressure to inflate the bulb, an air gage in the path of the conduit for regulating the air pressure, an independent conduit for supplying water to the esophagus of an animal at a point just beyond the inflated bulb to force the obstructing material down the esophagus, the air conduit being positioned within and protected by the water conduit, and means for adjusting the aforesaid members, substantially as set forth.

2. In a choke removing appliance, the combination of an inflatable rubber tube, a spool having a concave outer surface to provide a chamber between the tube and the spool, an air conduit opening into the aforesaid chamber, means for securing the rubber tube removably over the spool to permit of its convenient replacement when worn or punctured, said means including an end tap having a single large opening therethrough and pressure cones engaging the inflatable rubber tube against the inner portions of the spool, and a conduit a portion of which is flexible to admit of the flow of water to the esophagus of the animal beyond the rubber tube, whereby the rubber tube may be inflated to form a dam in the esophagus and water forced therebeyond to loosen and wash away the obstructing material.

3. In a choke removing appliance, the combination of an inflatable rubber tube, a spool having a concave outer surface to provide a chamber between the tube and the spool, metal longitudinally channeled members releasably connected to the spool, means for releasably securing the rubber tube over the spool to permit of its convenient replacement, a flexible tube connected to the aforesaid metal longitudinally channeled members, a channeled elbow connected to the flexible tube to provide a continuous but non-rigid conduit for the flow of water into the esophagus of an animal at a point beyond the inflated rubber tube to wash away obstructing material, an air conduit positioned within the water channel and opening into the air chamber outside of the spool member, a protective lengthening tube inclosing the air conduit after it emerges from the elbow above described, an air pressure gage in connection with said conduit, and means for adjusting the aforesaid elements, substantially as set forth.

OSCAR G. BECK.

Copies of this patent may be obtained for five cents each, by addressing the "Commissioner of Patents Washington, D. C."